(12) United States Patent
Tiberghien et al.

(10) Patent No.: US 8,256,743 B2
(45) Date of Patent: Sep. 4, 2012

(54) FEMALE COUPLING ELEMENT AND A QUICK COUPLING INCLUDING SUCH AN ELEMENT

(75) Inventors: Alain-Christophe Tiberghien, Sevrier (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 776 days.

(21) Appl. No.: 12/320,478

(22) Filed: Jan. 27, 2009

(65) Prior Publication Data

US 2009/0194722 A1    Aug. 6, 2009

(30) Foreign Application Priority Data

Feb. 6, 2008   (FR) ...................... 08 50757

(51) Int. Cl.
*F16L 37/28* (2006.01)
*F16L 37/36* (2006.01)
*E03B 1/00* (2006.01)

(52) U.S. Cl. .............. 251/149.9; 251/149.6; 137/614.06

(58) Field of Classification Search ............... 251/149.8, 251/149.9, 149.1, 149.3, 149.6; 137/614.06; 285/308, 317, 1
See application file for complete search history.

(56) References Cited

U.S. PATENT DOCUMENTS

| 4,039,213 A * | 8/1977 | Walters .................... 285/317 |
| 5,002,254 A | 3/1991 | Belisaire et al. |
| 5,806,832 A | 9/1998 | Larbuisson |
| 2003/0146623 A1 | 8/2003 | Lacroix |
| 2004/0094956 A1 | 5/2004 | Lacroix et al. |
| 2006/0289069 A1 * | 12/2006 | Alley et al. ................ 137/543 |
| 2008/0190491 A1 * | 8/2008 | Tiberghien et al. .......... 137/461 |
| 2008/0265574 A1 | 10/2008 | Tiberghien et al. |

FOREIGN PATENT DOCUMENTS

WO    WO 2006092503 A1 *   9/2006
WO    WO 2006100396 A1 *   9/2006

* cited by examiner

*Primary Examiner* — Dinh Q Nguyen
*Assistant Examiner* — Chee-Chong Lee
(74) *Attorney, Agent, or Firm* — Dowell & Dowell, PC

(57) ABSTRACT

A female element quick coupling for releasably joining two pipes conveying a fluid under pressure and which receives a male coupling wherein the female element includes a latch movable relative to a body of the female element between a first position, in which it retains the male portion in a leaktight coupling position, and a second position, in which it retains the male portion in a position for purging a downstream pipe. The female element further includes a control member mounted to slide in an open bore in the body for causing the latch to move at least towards the second position. This female element includes a gasket for closing a gap defined between an outer face of the member and an inside face of the bore especially at high purging pressures.

11 Claims, 6 Drawing Sheets

FEMALE COUPLING ELEMENT AND A QUICK COUPLING INCLUDING SUCH AN ELEMENT

BACKGROUND OF THE INVENTION

1. Field of the Invention

The present invention relates to a female coupling element and to a quick coupling for releasably joining together two pipes conveying a fluid under pressure, and including such a female element.

2. Description of Related Art

WO-A-2006/092503 describes a quick coupling comprising a female element and a male element that are connected respectively to an upstream pipe and to a downstream pipe, and that are suitable for being axially engaged one in the other. Relative engagement of the male and female elements causes a valve member mounted inside a body of the female element to open, thereby putting the upstream and downstream pipes into communication. The female coupling element includes a latch slidably mounted in the body of the female element and resiliently biased towards a position for locking the male element in its engaged configuration inside the female element. In order to separate the elements of the coupling, the female element also has a press button for sliding the latch against its resilient bias and suitable for moving the latch to a position for transiently retaining the male element inside the female element. When the latch is in its transient retaining position, the valve member of the female element closes the body of the female element, while the fluid contained in the downstream pipe flows to the outside of the coupling through gaps constituted by the clearances needed to enable the coupling to operate. When the pressure inside the coupling drops down to a safety threshold, the latch is pushed automatically by its resilient bias towards a position for releasing the male element relative to the female element. The male element is then ready to be separated from the female element, without any whiplash.

In order to ensure that the latch passes safely from its transient retaining position to its position for releasing the male element, the decompression of the inside of the coupling needs to be progressive and under control. The coupling described in WO-A-2006/092503 has gaps, through which fluid flows from the downstream pipe to outside the coupling, that are of sections that are not well controlled. These gaps constitute operating clearances between parts of the coupling that slide relative to one another. As a result, obtaining determined sections for these clearance gaps would require the parts of the coupling to be of precise dimensions and that would considerably increase the cost of fabricating such a coupling.

SUMMARY OF THE INVENTION

The invention seeks more particularly to remedy these drawbacks by proposing a female coupling element suitable for co-operating with a complementary male portion and enabling the male portion to be separated from the female element safely after a purging stage, while nevertheless presenting limited fabrication cost.

To this end, the invention provides a female element of a quick coupling for releasably joining together an upstream pipe and a downstream pipe conveying a fluid under pressure, the female element being suitable for receiving a male portion engaged therein along a longitudinal axis, the female element including a latch that is movable relative to a body of the female element between a first position, in which it is suitable for retaining the male portion in a position of leaktight coupling with an internal passage in the female element, and a second position, in which it is suitable for retaining the male portion in a position for purging the downstream pipe, the female element also comprising a control member for controlling movement of the latch, at least towards the second position, the control member being slidably mounted in a bore that opens to the outside of the body of the female element, the female element being characterized in that it includes a gasket suitable for closing a gap defined between an outer face of the control member and an inside face of the bore.

In the meaning of the invention, the term "bore" is used to mean a housing of arbitrary shape, not necessarily of cylindrical shape.

According to other characteristics of a female coupling element in accordance with the invention that are advantageous, taken individually or in any technically feasible combinations:

- the gasket is suitable for closing said gap at least in the presence of relative high pressure in a passage for purging the downstream pipe;
- the gasket is suitable for closing said gap solely in the presence of relative high pressure in a passage for purging the downstream pipe;
- the gasket is suitable for being compressed both against the outer face of the control member and against the inside face of the bore solely in the presence of relative high pressure in a passage for purging the downstream pipe;
- the control member includes an outer peripheral groove for receiving the gasket;
- the control member includes a portion for actuating the control member, the groove for receiving the gasket being formed in an outer face of the actuator portion and extending parallel to an edge at the intersection between an outside surface of the body of the female element and the bore in which the control member slides;
- each orifice of the purging passage that opens out in the presence of relative high pressure in the purging passage, opens to the outside of the female element along an axis that is substantially parallel to the longitudinal axis of the female element;
- the latch and the control member are two distinct parts;
- the latch is slidably movable relative to the body of the female element between the first and second positions parallel to an axis extending transversely relative to the longitudinal axis of the female element; and
- the female element includes means for resiliently returning the latch towards the first position.

The invention also provides a quick coupling for releasably joining together two pipes conveying a fluid under pressure, said coupling comprising a female element and a male element suitable for being coupled together, the female element being as described above.

BRIEF DESCRIPTION OF THE DRAWINGS

The characteristics and advantages of the invention appear in the following description of two embodiments of a female element and a quick coupling in accordance with the invention, given purely by way of example and made with reference to the accompanying drawings, in which.

DESCRIPTION OF THE PREFERRED EMBODIMENTS

Figure 1:
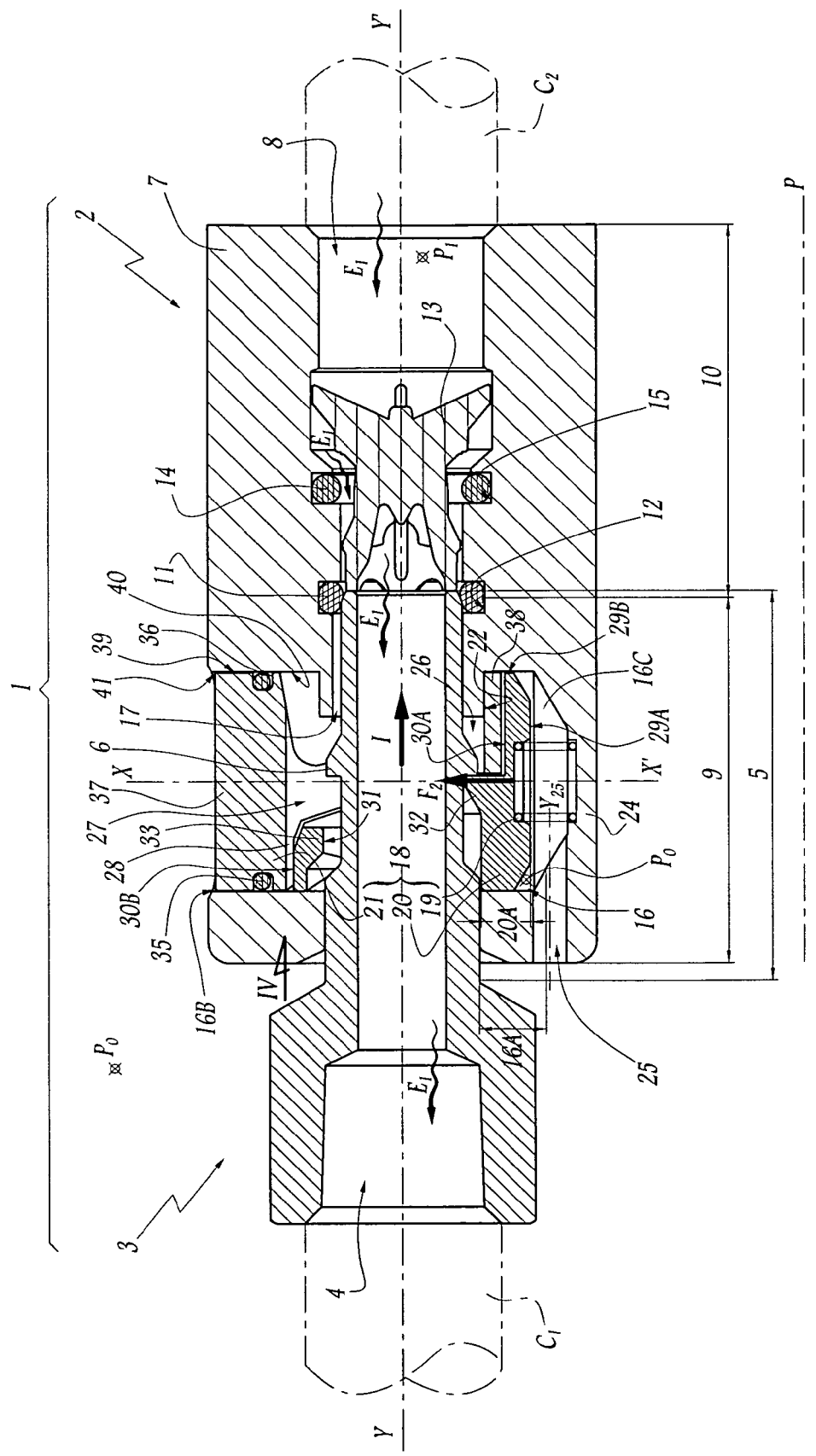
FIG. 1 is a diagrammatic axial section of a quick coupling in accordance with a first embodiment of the invention, with its male and female elements in the engaged configuration.
Figure 2:
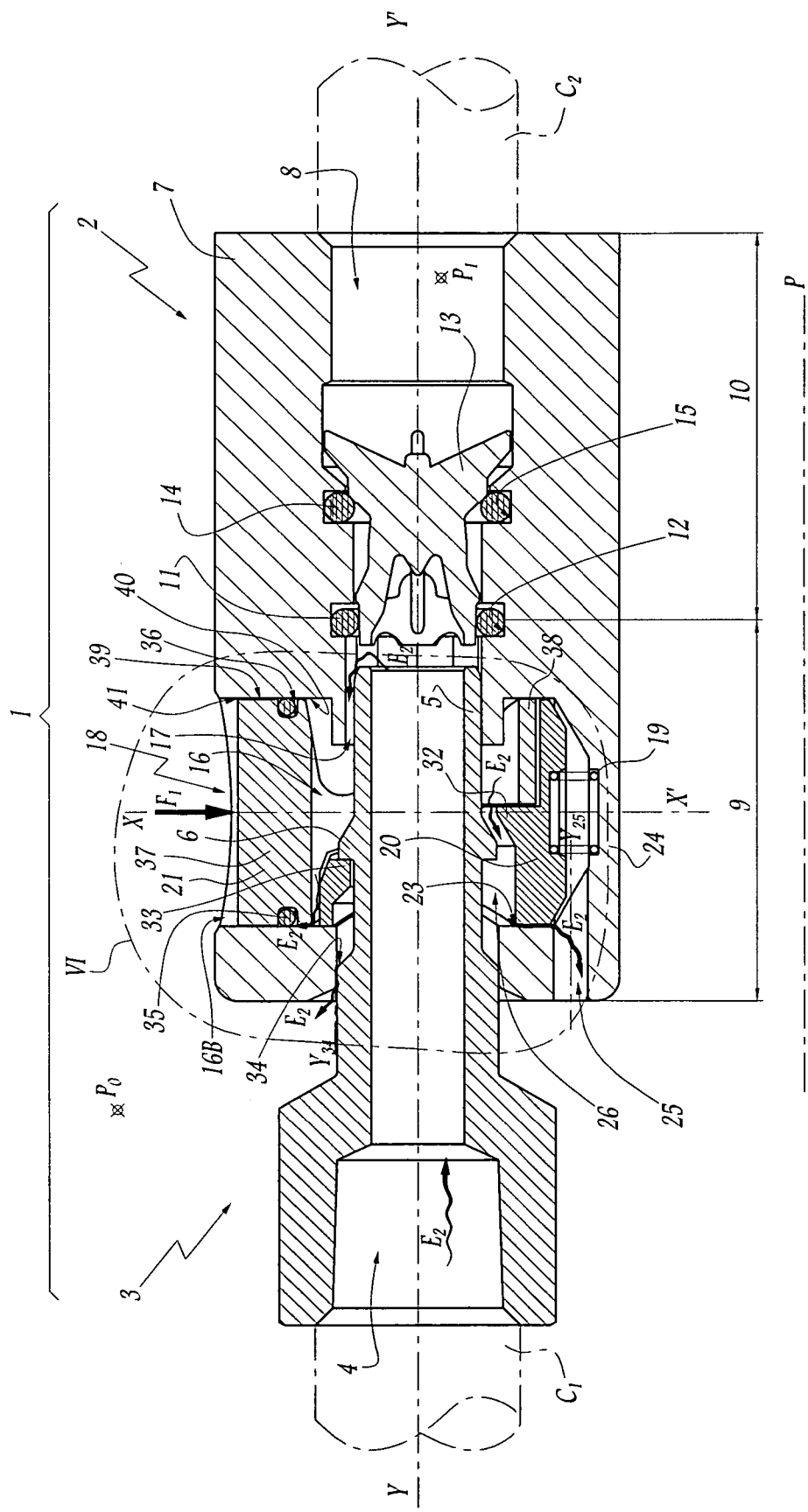
FIG. 2 is a section analogous to FIG. 1, during a first step of purging the coupling.
Figure 3:
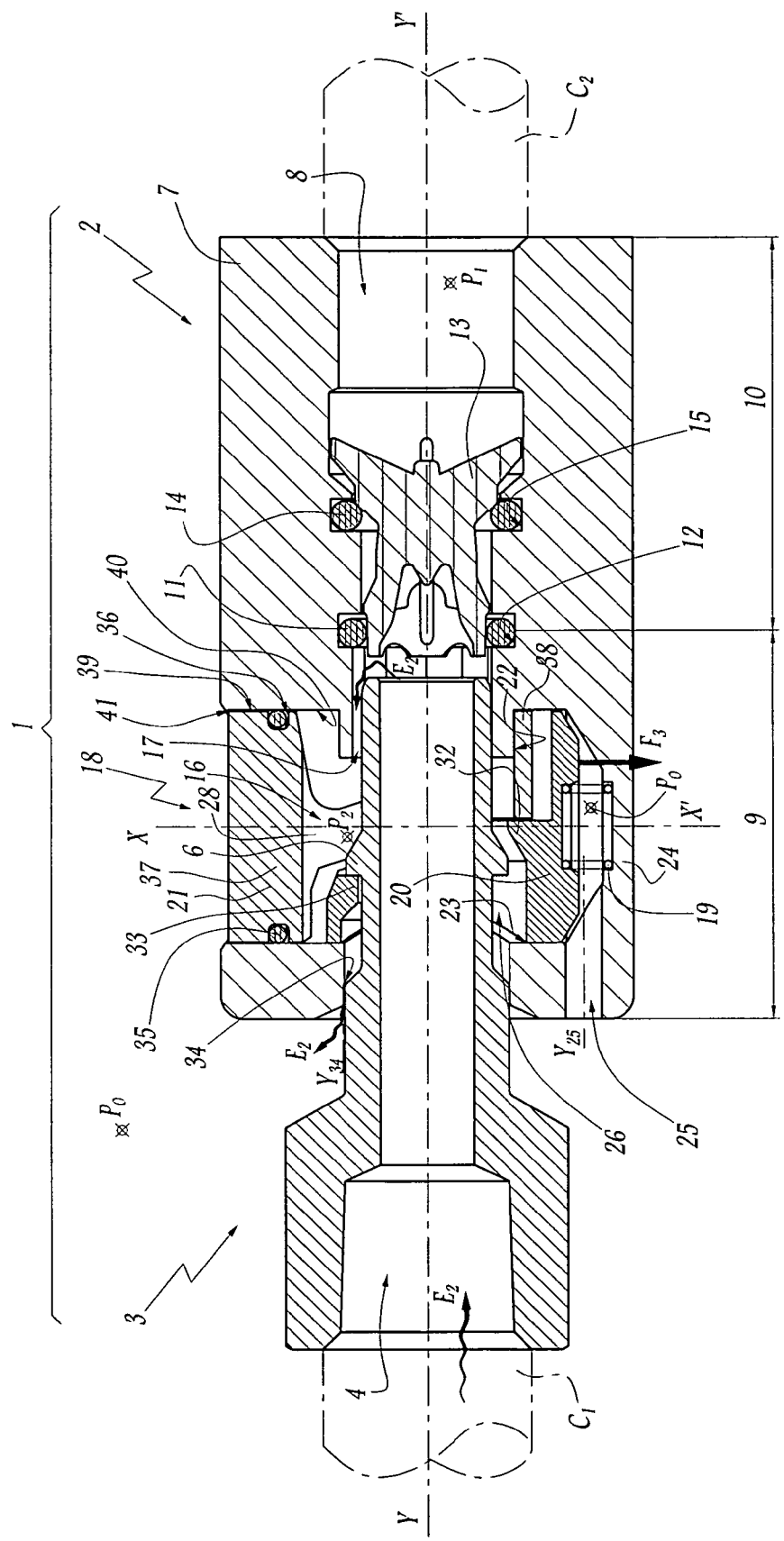
FIG. 3 is a section analogous to FIG. 1, during a second step of purging the coupling.

The quick coupling 1 shown in FIGS. 1 to 3 is for coupling together two pipes $C_1$ and $C_2$ conveying a fluid under pressure. In the present specification and in the accompanying claims, the terms "upstream" and "downstream", and analogous terms, refer to the flow direction of the fluid under pressure through the coupling 1, this flow direction being represented by arrows $E_1$ in FIG. 1.

The coupling 1 comprises a female element 2 and a complementary male portion that is constituted by a male element 3 in this first embodiment. The elements 2 and 3 are designed to engage one in the other along the direction of an axis Y-Y', which is a longitudinal axis common to the elements 2 and 3.

In the meaning of the invention, a proximal portion of one of the elements 2 or 3 is a portion facing or close to the pipe $C_1$ or $C_2$ connected to said element, whereas a distal portion is a portion facing towards or close to the other element when the elements are facing each other, ready to be engaged.

An axial passage 4 for the fluid under pressure passes through the male element 3 and opens out at both ends thereof. Coupling means for coupling one end of the passage 4 to the pipe $C_1$, which pipe is downstream from the coupling 1 and is represented by chain-dotted lines, may be of any suitable type, and by way of example may comprise a clamping collar that is not shown for reasons of clarity. At its end opposite from the pipe $C_1$, the male element 3 has an end portion in the form of a plug 5. On the plug 5, and at a distance from its free edge, the male element 3 has an annular collar 6.

The female element 2 comprises a body 7 having an axial hole 8 centered on the axis Y-Y' passing right through it. A portion of this hole 8 is complementary to the plug 5 and forms a housing 9 into which the plug 5 can be engaged. Another portion of the hole 8 extends the housing 9 and forms a passage 10 for the fluid under pressure. Means for coupling the mouth of the passage 10 to the pipe $C_2$, which pipe is upstream from the coupling 1 and is represented by chain-dotted lines, may be of any suitable type, and by way of example may comprise a clamping collar that is not shown for reasons of clarity. At the junction between the housing 9 and the passage 10, an O-ring gasket 11 serves to provide sealing for the coupling between the passages 4 and 10 and is received in an annular groove 12.

A valve member 13 for closing the passage 10 is slidably mounted therein in known manner. It is movable between an open position and a closed position, the closed position being the position shown in FIGS. 2 and 3, in which the valve member 13 projects into the housing 9 and closes the passage 10 by being pressed against a sealing O-ring gasket 14 mounted in an annular groove 15. In its open position as shown in FIG. 1, the valve member 13 is spaced apart from the gasket 14.

A hole 16 extending transversely relative to the axis Y-Y' is formed in the female body 7 so as to intersect the housing 9. A plurality of axial grooves 17 (three in number in the example described) extend from this hole 16 towards the passage 10 and terminate at the gasket 11.

The female body 7 is fitted with a locking mechanism 18 for locking the plug 5 of the male element 3 in the housing 9. The mechanism is mounted in the hole 16 and comprises a spring 19, a latch 20 and a control member 21 for controlling the latch 20. More precisely, the control member is a button 21 for pushing the latch 20 against the force from the spring 19 in the direction represented by arrow $F_1$ in FIG. 2, representing manually-applied pressure. The button 21 is mounted in the outlet 16B of the hole 16, which hole forms a bore in which the button 21 can slide relative to the body 7 parallel to an axis X-X' of the hole 16. The button 21 is thus suitable for being actuated manually towards the inside of the body 7 from outside the body 7.

Figure 5:
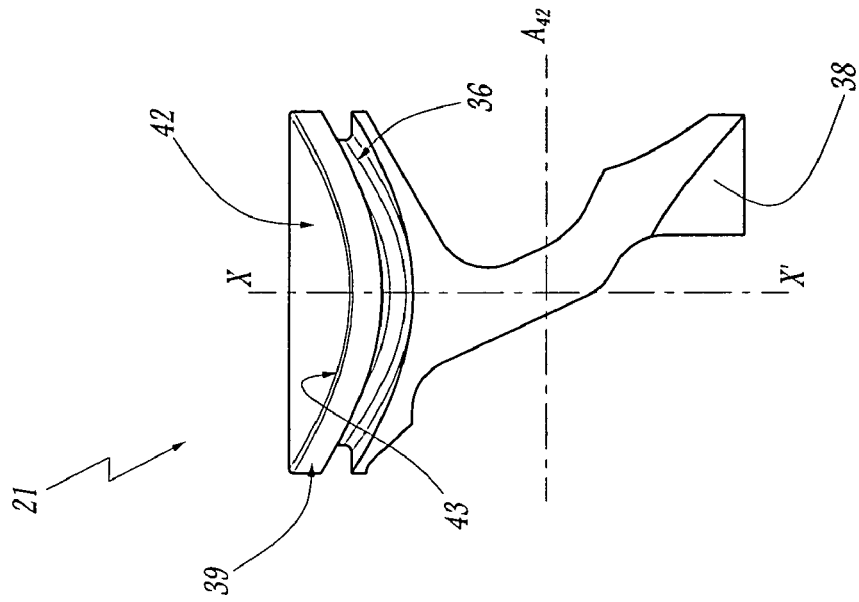
FIG. 5 is a side view of the FIG. 4 member, seen looking along arrow V in FIG. 4.
Figure 4:
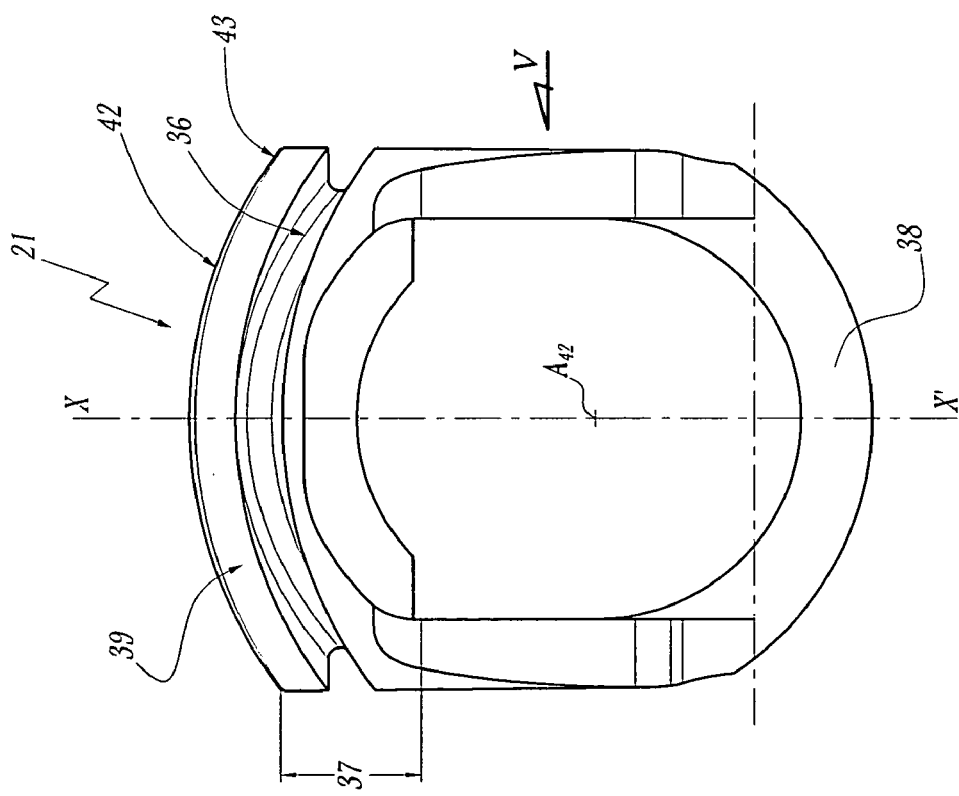
FIG. 4 is a view on a larger scale seen looking along arrow IV of FIG. 1, and showing a control member forming part of the coupling of FIGS. 1 to 3.
Figure 6:
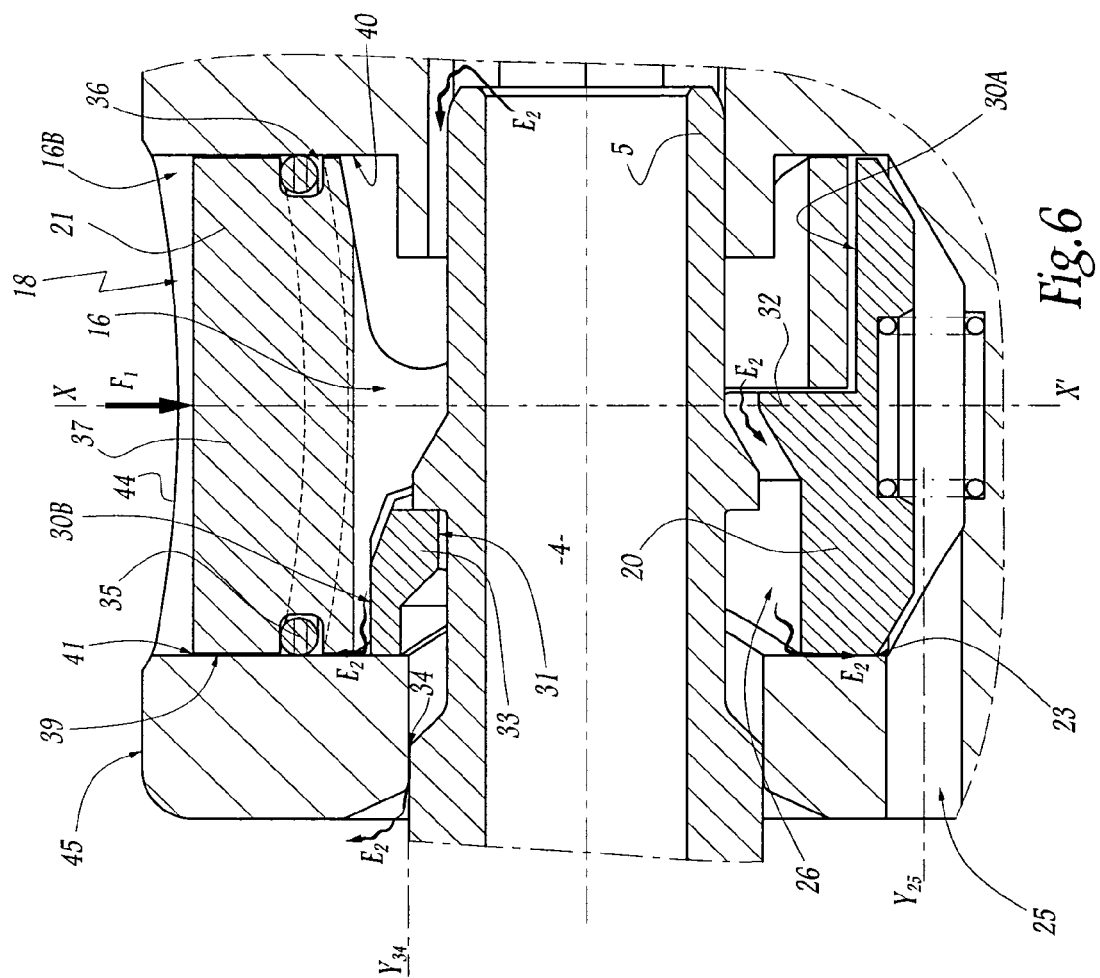
FIG. 6 is a view on a larger scale showing a detail VI of FIG. 2.

As shown in FIGS. 4 and 5, the button 21 comprises a head 37 for enabling an operator to actuate the button 21, the head 37 being of cylindrical cross-section perpendicularly to the axis X-X' of FIG. 2. This head 37 is designed to slide in the bore 16B. The button 21 also has an end portion 38, opposite from its head 37, and suitable for being brought to face an inside shoulder 32 of the female body 7 when the head is received in the bore 16B. The shoulder 32 thus forms an abutment for retaining the button 21 in the body 7.

The surface of the head 37 facing away from the portion 38 is referenced 42. This surface 42 constitutes the outside face for maneuvering the button 21. The face 42 is in the form of a portion of a cylinder centered on an axis $A_{42}$ that is parallel to the axis Y-Y' when the button 21 is in its mounted configuration. The outer radial face of the head 37 is referenced 39; it is cylindrical and centered on the axis X-X' when the button 21 is in the mounted configuration.

The edge interconnecting the faces 39 and 42 is referenced 43. This edge 43 is generally saddle-shaped, given the respective shape of the surfaces 39 and 42.

On its outer radial face 39, the head 37 of the button 21 is provided with an outer peripheral groove 36 that, when the button 21 is in the mounted configuration, extends parallel to an edge 44 at the intersection between the cylindrical outer surface 45 of the female body 7 and the hole 16. Relative to the housing 9, the groove 36 is situated beside the head 37 of the button 21 and the outlet 16B of the hole 16. Insofar as the face 42 of the button 21 is cylindrical and generally parallel to the outside surface 45 of the female body 7, the groove 36 also extends generally parallel to the edge 43. The groove 36 thus presents the shape of a wave. This shape for the groove 36 serves to limit the size of the button 21 and of the female body 7. The groove 36 presents a shape that is curved both in the plane of FIG. 4 and in the plane of FIG. 5, with a concave side facing downwards in FIG. 4 and a concave side facing upwards in FIG. 5, i.e. in the opposite direction.

The groove 36 is suitable for receiving an O-ring gasket 35 that is for making contact with an inside face 40 of the bore 16B when the button 21 is in its mounted configuration in the hole 16.

In its rest configuration, which corresponds to equal pressures on either side of the gasket 35, the gasket 35 does not close in sealed manner a gap 41 formed between the outer face 39 of the head 37 and the inside face 40 of the bore 16B, i.e. the gasket is not compressed between a surface of the groove 36 and the face 40 of the bore 16B.

Like the button 21, the latch 20 is mounted to slide in the hole 16, so as to be movable parallel to the axis X-X' of the hole 16, i.e. substantially transversely relative to the axis Y-Y' of the housing 9 and of the passage 10.

The spring 19 performs the function of a resilient return member urging the latch 20 towards the outlet 16B, towards a position in which the latch 20 is suitable for retaining the male plug 5 in a position in which it is in leaktight coupling with the passage 10 of the female element 2, i.e. urging the latch in the direction represented by arrow $F_2$ in FIG. 1. For this purpose, the spring is compressed between the latch 20 and an end wall 24 defining the end of the hole 16 that is remote from button 21. Reference 16A designates the portion of the hole 16 in which there slides a portion 20A of the latch 20 that is remote from the head 37 of button 21. The volume 16C defined between the end wall 24 and the portion 20A of the latch 20 is in communication with the outside of the female element 2 via a channel 25 centered on an axis $Y_{25}$ substantially parallel to the longitudinal axis Y-Y'. The volume 16C is thus always at outside pressure $P_0$.

FIGS. 1 to 3 are diagrammatic, particularly since, for reasons of clarity, the female body 7 is shown as being made as a single part whereas, in reality, it is built up by assembling a plurality of parts that are separate from one another while the latch 20, the button 21, and the valve member 13 are being installed.

A passage 26 for the plug 5 is pierced through the latch 20 and interconnects two portions of the housing 9. One of these two portions is deeper and narrower than the other. Its wall is suitable for guiding the distal end of the plug 5 and it defines the axial grooves 17. One end of the hole 16 is closed in non-hermetically sealed manner by the button 21, but it is not closed by the latch 20 because there is a passage 27 formed through the latch 20. In contrast, at its other end, the hole 16 is closed in non-hermetically sealed manner by the latch 20. The latch 20 and the button 21, which are two separate parts, co-operate with the wall of the hole 16 to define a chamber 28 of variable volume, which chamber is put into communication with the housing 9 by the passages 26 and 27.

The total surface of the latch 20 can be subdivided into four types of surface. The first type of surface is not in contact with the fluid present in the housing 9. In addition, since it does not slide against the wall of the hole 16, it does not guide the latch 20. In the example shown, only the end surface 29A facing the end wall 24 is of the first type. The surface of the second type is a single surface pierced by the passage 26 in the example shown and it is referenced 29B. This is the surface that guides the latch 20 while it is sliding in the hole 16 by sliding against the wall of the hole. The third and fourth types of surface are in contact with the fluid present in the housing 9 and differ from each other in their orientations. More precisely, the third type of surface faces generally in the direction of arrow $F_2$, i.e. towards the outlet 16B and the button 21, whereas the fourth type of surface faces the other way, i.e. towards the end wall 24. In the example shown, there are two surfaces of the third type. These two surfaces are referenced 30A and 30B. The surface 30A defines part of the passage 26, while the surface 30B defines part of the variable volume chamber 28. In the example shown, only one surface, referenced 31, is a surface of the fourth type. The surface 31 and the surface 30B, when projected in the direction of the axis X-X', which is the sliding direction of the latch 20, e.g. onto a plane P perpendicular to said direction, both present the same area. As a result, the projections of the surfaces 30A and 30B parallel to the axis X-X' onto the plane P present an area greater than the projection of the surface 31 parallel to said axis X-X', likewise onto the plane P.

The latch 20 has two internal teeth or projections 32 and 33 for enabling the male element 3 to be retained by means of its collar 6. These projections 32 and 33 are offset from each other along the axis Y-Y'. Each of them is in the form of a bulge occupying half the circumference of the passage 26.

The projection 32 is offset from the projection 33 in the direction I in which the plug 5 is inserted into the female element 2. Relative to the axis Y-Y', the projection 32 is on the same side as the spring 19, whereas the projection 33 is on the same side as the head 37 of the button 21.

When the male and female elements 2 and 3 are in the dissociated configuration (not shown in the figures), the valve member 13 is suitable for sliding freely, and the pressure of the fluid in the upstream pipe $C_2$ places it in its downstream, closing position. Furthermore, the spring 19 pushes the latch 20 against the button 21, such that the end portion 38 of the button 21 is pressed against the shoulder 22. The elements 2 and 3 are assembled together by pushing the plug 5 into the housing 9 along the direction of the axis Y-Y'. During this operation, the collar 6 snap-fastens behind the projection 32. When the plug 5 is fully inserted, it pushes the valve member 13 upstream to its open position, as shown in FIG. 1.

In FIG. 1, the coupling 1 provides a junction between the pipes $C_1$ and $C_2$. The plug 5 having its collar 6 held by the projection 32 in the housing 9 holds the valve member 13 in its open position, against the pressure $P_1$ of the fluid in the upstream pipe $C_2$. Furthermore, the gasket 11 seals the coupling between the passages 4 and 10, while hermetically isolating the housing 9 from these passages 4 and 10. The latch 20 is then in a position for retaining the male element 3 in a leaktight coupling position with the passage 10 of the female element 2.

In order to dissociate the male element 3 from the female element 2, thrust $F_1$ is exerted on the button 21 so as to move the latch 20 towards the end wall 24 against the spring 19 far enough to allow the collar 6 to go past the projection 32 and for the pressure of the fluid in the coupling 1 to cause the plug 5 to slide outwards relative to the body 7 of the female element. The pressure applied to the button 21 by an operator acting on the head 37 of the button can be applied easily since the gasket 35 is not compressed between a surface of the groove 36 and the inside face 40 of the bore 16B, such that the friction exerted by the gasket 35 between the button 21 and the bore 16B is small. Thereafter, the coupling 1 is in the configuration shown in FIG. 2 in which the latch 20 is in a position for retaining the male element 3 in a position for purging the fluid that lies in the downstream pipe $C_1$.

More precisely, as shown in FIG. 2, when the male element 3 is in its purging position relative to the female element 2, the projection 33 prevents the plug 5 being ejected out from the body 7 by retaining said plug 5 by means of its collar 6. The plug 5 is pushed into the body 7 to a smaller extent than in FIG. 1, in such a manner that the valve member 13 can close the passage 10, and the axial grooves 17 put the passage 4 into communication with the passage 26. In the purging position, the male element 3 co-operates with the female element 2 to define a passage for purging the fluid contained in the downstream pipe $C_1$. This fluid escapes by passing via the passage 4 and then via the grooves 17 and the passage 26. The fluid then passes into the chamber 28 and into the gap 41 defined between the outside face 39 of the head 37 of the button 21 and the inside face 40 of the bore 16B, and also into a gap 34 defined between the wall of the shallowest portion of the housing 9 and the plug 5, and into a gap 23 defined between the portion 20A of the latch 20 and the portion 16A of the hole 16, as represented by arrows $E_2$ in FIG. 2. In particular, the section of the gap 41 may be greater than the sections of the gaps 23 and 34. The gap 34 extends along an axis $Y_{34}$ that is substantially parallel to the longitudinal axis Y-Y'. The pressure of the fluid that is escaping acts on the gasket 35 received in the grooves 36 of the head 37, compressing it against the edge of the groove 36 that is the outermost edge relative to the body 7, i.e. the edge furthest away from the end wall 24, and against the inside wall 40 of the bore 16B, such that the gasket 35 closes in leaktight manner the gap 41 defined between the bore 16B and the head 37 of the button 21. Thus, during purging, i.e. when there is extra pressure $P_2$ in the purge passage, the gasket 35 closes the gap 41 in leaktight manner. The chamber 28 is thus better sealed and, because of the relative narrowness of the gaps 23 and 34, the head loss through these gaps 23 and 34 is considerable. That is why, during purging $E_2$, the pressure $P_2$ in the housing 9, in the passage 26, and in the chamber 28, remains relatively high, i.e. at a pressure $P_2$ significantly greater than the outside pressure $P_0$. The portion 20A of the latch 20 separates the zone subjected to the relatively high pressure $P_2$ from the zone subjected to the outside pressure $P_0$.

In FIG. 3, purging $E_2$ of the downstream pipe $C_1$ continues without the male element 3 being ejected from the female element 2, even though pressure is no longer applied to the button 21. This results from the higher pressure $P_2$ within the housing 9 and within the chamber 28 relative to the outside to the coupling 1. This higher pressure $P_2$ acts on the surfaces 30A, 30B, and 31 of the latch 20 and produces a force $F_3$ on the latch parallel to the axis X-X' and opposing the return force exerted by the spring 19 in the direction $F_2$, the force $F_3$ urging the latch 20 into a position for retaining the male element 2 in the purging position, and resulting from the sum of the areas of the projections of the surfaces 30A and 30B parallel to the axis X-X' onto the plane P presents a total area greater than the area of the projection of the surface 31 parallel to said axis X-X', likewise onto the plane P.

In other words, the thrust that results from the higher pressure $P_2$ acting on the surfaces 30B and 31 is nil, such that the latch 20 is subjected solely to the thrust resulting from said higher pressure $P_2$ acting on the surface 30A, i.e. on the portion 20A of the latch 20, to the thrust resulting from outside pressure $P_0$ acting on the surface 29A, i.e. on the same portion 20A, and to the thrust exerted by the spring 19. The spring 19 is rated in such a manner as to be capable of urging the latch 20 in the direction of arrow $F_2$ only once the pressure $P_2$ in the housing 9 and the chamber 28 has dropped below a predetermined threshold below which said higher pressure can no longer lead to the element 3 being ejected in violent and dangerous manner. Urging the latch 20 in the direction $F_2$ releases the plug 5 relative to the tooth 33, thereby enabling the male element 3 to be withdrawn from the female element 2. Personnel and equipment in the vicinity of the coupling 1 are thus protected.

In particularly advantageous manner, dissociating the elements 2 and 3 of the coupling 1 requires no more than a manual press to be exerted on the button 21 for causing the latch 20 to move from its position for retaining the male element 3 in a position of leaktight coupling with the passage 10 in the female element 2 towards its position for retaining the male element 3 in a position for purging the downstream pipe $C_1$.

Figure 7:
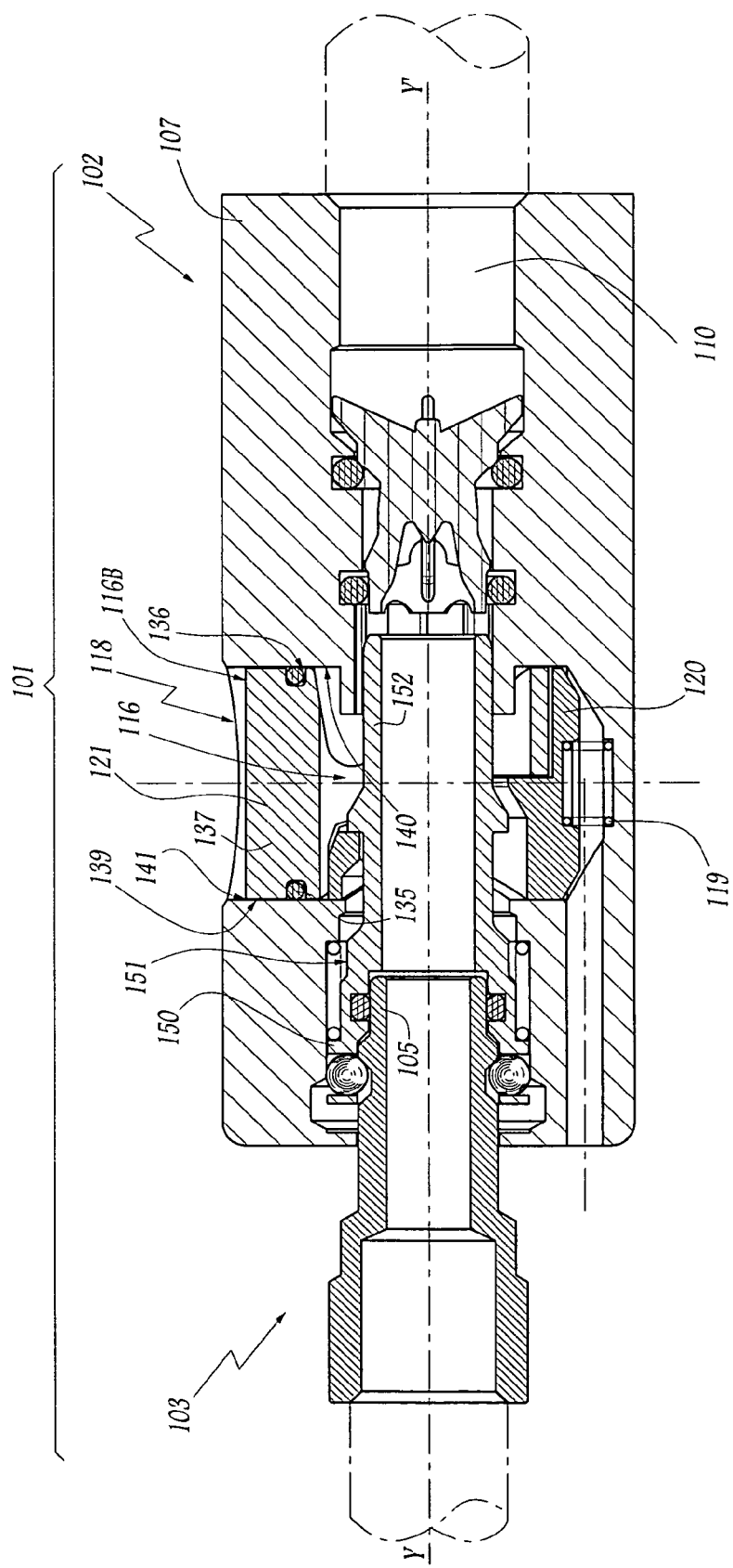
FIG. 7 is a section analogous to FIG. 2 for a coupling in accordance with a second embodiment of the invention.

In FIG. 7, which is diagrammatic as are FIGS. 1 to 3, there can be seen a coupling 101 constituting a second embodiment of the invention. Below, differences between the coupling 101 and the coupling 1 are described in greater detail. In addition, a reference used below specifying a portion of the coupling 101 that is analogous or equivalent to a reference portion of the coupling 1 is obtained by adding 100 to the reference identifying said portion of the coupling 1.

The coupling 101 in this second embodiment comprises a male element 103 and a female element 102 having its body 107 fitted with an adapter 150 having the same function as the adapter described in patent application EP 1 422 462. At its distal end, this adapter 150 has female means 151 for receiving and coupling the male plug 105 of the male element 103, while its other end defines a male plug 152. It thus constitutes a coupling element that is both male and female.

The female body 107 is also fitted with a locking mechanism 118 mounted in a hole 116 of the body 107 extending transversely relative to the longitudinal axis Y-Y' of the female element 102. The mechanism 118 is analogous to the mechanism 18 of the first embodiment and it comprises a spring 119, a latch 120, and a button 121 for controlling the latch 120. The latch 120 is similar to the latch 20 of the first embodiment and it serves to lock, at two different depths, the plug 152 of the adapter 150, to which plug the male element 103 has previously been locked in leaktight manner. The latch 120 is thus movable between two positions, in one of which it retains the adapter 150 in a position of leaktight coupling with an internal passage 110 of the female element 102, and in a second of which it retains the adapter 150 in a position for purging the downstream pipe $C_1$. Similarly, the button 121 is similar to the above-described button 21. In particular, a head 137 of the button 121 is mounted in an outlet 116B of the hole 116 that forms a bore in which the head 137 can slide relative to the body 107 parallel to the axis of the hole 116, so that the button 121 is suitable for being pressed manually towards the inside of the body 107 from outside said body. The head 137 of the button 121 is provided with an outer peripheral groove 136 for receiving an gasket 135 that is to come into contact with the inside face 140 of the bore 116B when the button 121 is in its configuration mounted in the hole 116. In its rest configuration, the gasket 135 does not close in leaktight manner a gap 141 formed between the outer face 139 of the head 137 and the inside face 140 of the bore 116B. The operation of the coupling 101 in this second embodiment is analogous to the operation of the coupling 1 of first embodiment. After purging, the adapter is released relative to the latch 120 and is pushed towards a position for releasing the male element.

As can be seen from the two above-described embodiments, a female coupling element and a coupling in accordance with the invention enable a male element, i.e. respectively the male element 3 in the first embodiment and the male portion 152 of the adapter 150 in the second embodiment, to be separated safely from the female element after a stage of purging the fluid contained in the downstream pipe. The reliability with which the inside of a coupling of the invention is decompressed is improved compared with couplings of the prior art, thereby ensuring that the latch passes safely from its transient retaining position to its position for releasing the male portion.

The increased reliability of decompression comes firstly from good control over the sections of the gaps through which fluid flows from the downstream pipe to outside the coupling, with this being obtained easily by precise dimensioning of the gaps 34 at the outlet of the female body and of the gap 23 between the latch portion 20A and the portion 16A of the hole 16, and by the clearance gap 41, 141 between the control member 21, 121 and its sliding bore 16B, 116B being closed in leaktight manner by the gasket 35, 135.

The improved sealing of the internal chamber 28 of the coupling in the purging configuration that results from the presence of the gasket 35, 135 also makes it possible to improve raising the pressure of said internal chamber, thereby contributing to the increased reliability with which the latch is held in its position for retaining the male portion in the purging position against the resilient force from the spring 19, 119.

Furthermore, the presence of the gasket 35, 135 at the interface between the control member 21, 121 and the bore 16B, 116B serves to protect the inside of the female element against dust or moisture that might penetrate via the gap 41, 141. This ensures that the control member 21, 121 slides reliably in the bore 16B, 116B, and also that the latch 20, 120 slides reliably between its purging position and its position for releasing the male portion, since the friction that occurs between the latch 20, 120 and the male portion 3, 152 is under control.

Furthermore, because the gap 41, 141 is closed in leaktight manner by the gasket 35, 135, there is no need to provide accurate relative dimensioning for the control member 21, 121 and the bore 16B, 116B. Thus, the parts of the female element of a coupling of the invention are easier to fabricate and the element can present a limited cost of fabrication. In particular, the control member 21, 121 can be fabricated inexpensively by molding a synthetic material.

A female coupling element and a coupling in accordance with the invention also enable the coupling to be improved ergonomically relative to couplings of the state of the art. Because the decompression parameters relating to the inside of the coupling are controlled, it is possible to dimension very accurately the return force exerted by the spring 19, 119. In addition, during the purging stage, the fluid is channeled through passages presenting high levels of head loss, in particular the gaps 23 and 24, such that the pressure of the fluid that escapes to the outside is greatly reduced, thereby guaranteeing safety of an operator. This effect is reinforced by the fact that the escape orifices in the presence of higher pressure in the purging passage of a coupling of the invention open to the outside of the female element axially to the face having the mouth of the female element, so the streams of fluid escaping are felt to a smaller extent by the hand of an operator in position around the female element in order to act on the control member 21, 121. Furthermore, since the gasket 35, 135 is compressed solely during the purging stage between the outer face of the head of the control member 21, 121 and the inside face of the sliding bore 16, 116B, the opposing friction exerted by the gasket 35, 135 against the actuation force exerted by an operator on the head of the control member is small. Advantageously, the radial size of the control member 21, 121 and of the female element 2, 102 is not increased by the presence of the gasket 35, 135, since the groove 36, 136 in which the gasket 35, 135 is received follows the outside shape of the head of the control member.

The invention is not limited to the examples described and shown. In particular, the gasket 35, 135 that is designed to come into contact with the outer face of the control member 21, 121 and the inside face of the bore 16B, 116B of a female coupling element of the invention can be mounted in a peripheral groove in the bore 16B, 116B, formed in the inside face 40, 140, instead of in an outer peripheral groove in the control member 21, 121.

This gasket 35, 135 may also be designed to close the gap 41, 141 in leaktight manner on a permanent basis, regardless of the configuration of the coupling.

Furthermore, a female coupling element in accordance with the invention may include a locking mechanism having three radial teeth, analogous to the mechanism described in patent application EP 1 333 218, a gasket being provided at the point of contact between the outer face of a head of the control member of the locking mechanism and the inside face of the sliding bore for said control member, as in the examples described above.

Finally, the invention is described with a latch 20, 120 and a control member 21, 121 that are designed as two distinct parts. In a variant, the latch and the control member of a female coupling element of the invention could constitute a single part, and by way of example it could have a structure and a method of operation analogous to the structure and the method of operation of the fifth embodiment of WO-A-2006/092503.

The invention claimed is:

1. A female element of a quick coupling for releasably joining together an upstream pipe and a downstream pipe conveying a fluid under pressure, the female element being suitable for receiving a male coupling engaged therein along a longitudinal axis thereof, the female element comprising a latch that is movable relative to a body of the female element between a first position in which it retains the male coupling in a position of leaktight coupling with an internal passage in the female element and a second position in which it retains the male coupling in a position for purging the downstream pipe, the female element also including a control member for controlling movement of the latch at least towards the second position, the control member being slidably mounted in a bore that opens to outside the body of the female element, and wherein the female element includes a gasket for closing a gap defined between an outer face of the control member and an inside face of the bore.

2. The female element according to claim 1, wherein the gasket closes the gap at least in the presence of relative high pressure in a purging passage for purging the downstream pipe.

3. The female element according to claim 2, wherein the purging passage that opens out in the presence of relative high pressure includes escape orifices through which pressurized fluid discharges to the outside of the female element along an axis that is substantially parallel to the longitudinal axis of the female element.

4. The A female element according to claim 1, wherein the gasket closes the gap solely in the presence of relative high pressure in a purging passage for purging the downstream pipe.

5. The female element according to claim 1, wherein the gasket is compressed both against the outer face of the control member and against the inside face of the bore solely in the presence of relative high pressure in a passage for purging the downstream pipe.

6. The female element according to claim 1, wherein the control member includes an outer peripheral groove for receiving the gasket.

7. The female element according to claim 6, wherein the control member includes an actuator portion for actuating the control member, the groove for receiving the gasket being formed in an outer face of the actuator portion and extending parallel to an edge at an intersection between an outside surface of the body of the female element and the bore in which the control member slides.

8. The female element according to claim 1, wherein the latch and the control member are two distinct parts.

9. The female element according to claim 1, wherein the latch is slidably movable relative to the body of the female element between the first and second positions parallel to an axis extending transversely relative to the longitudinal axis of the female element.

10. The female element according to claim 1, including spring means for resiliently returning the latch towards the first position.

11. A quick coupling for releasably joining together two pipes conveying a fluid under pressure, the coupling comprising a female element and a male element suitable for being coupled together, wherein the female element is the female element of claim 1.

* * * * *